United States Patent [19]

Nehrkorn

[11] 4,407,430

[45] Oct. 4, 1983

[54] APPARATUS FOR DELIVERING MERCHANDISE FROM A VENDING MACHINE

[76] Inventor: Rolf Nehrkorn, Weender Strasse 63, 3400 Göttingen, Fed. Rep. of Germany

[21] Appl. No.: 254,853

[22] Filed: Apr. 16, 1981

[30] Foreign Application Priority Data

Apr. 19, 1980 [DE] Fed. Rep. of Germany ....... 3015183

[51] Int. Cl.³ .............................................. B65G 59/06

[52] U.S. Cl. ..................................... 221/122; 221/127

[58] Field of Search ....................... 194/2, 10; 221/131, 221/132, 126, 127, 128, 125, 268, 270, 121, 122, 120

[56] References Cited

U.S. PATENT DOCUMENTS 3,166,214 1/1965 Stevens et al. .................. 221/120 X

*Primary Examiner*—Stanley H. Tollberg

*Attorney, Agent, or Firm*—Toren, McGeady and Stanger

[57] ABSTRACT

An ejecting assembly is provided, which comprises an ejector guide and an ejector which is reciprocable along the ejector guide in ejecting and return directions. An element is provided which is movable past all of the juxtaposed storage columns for holding merchandise and adapted to interengage with the ejecting assembly and to control the reciprocation of the ejector. In order to avoid the expenditure involved in the provision of a plurality of ejectors and associated control elements and to permit a more uniform motion of the ejector to be effected by a relatively simple structure comprising a simple drive, the above-mentioned element, which is adapted to be moved past all storage columns, serves to impart a search movement to only one ejector in an ejector guide relative to a selectable storage column as well as to reciprocate the ejector for an ejection and the ejector guide is adapted to be connected by coupling structure associated with the storage columns to the element for the search movement and to the storage columns for the ejecting movement of the ejector.

10 Claims, 6 Drawing Figures

APPARATUS FOR DELIVERING MERCHANDISE FROM A VENDING MACHINE

Figure 1:
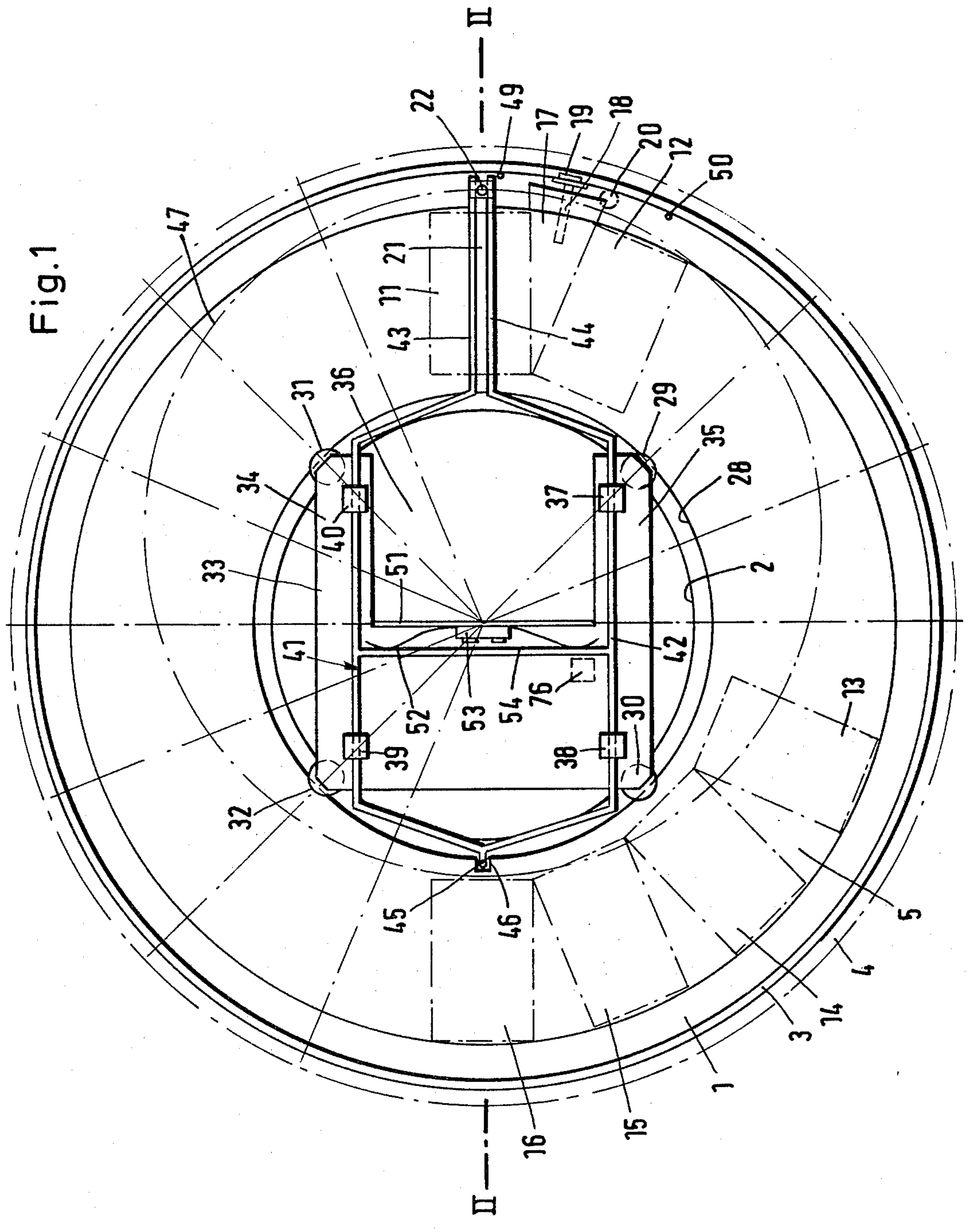

This invention relates to apparatus for delivering merchandise from a vending machine comprising juxtaposed storage columns for holding merchandise, an ejecting assembly having an ejector guide and an ejector, which is reciprocable along the ejector guide in ejecting and return directions, and also comprising an element which is movable past all columns and interengages with the ejecting assembly and to control the reciprocation of the ejector.

In such apparatus for delivering merchandise, the storage column may be arranged in a circular array so that the vending machine is cylindrical and the merchandise is centrally ejected, or the columns may be juxtaposed and provided with respective delivery chutes. Particularly where the columns are arranged in a circular array, an ejector-controlling annular disk having two oppositely tapering wedge-shaped edges may be disposed under the columns. Such wedge-shaped edges may be described as eccentric guides although in connection with the invention the term eccentric guide is mainly used for guide slots or grooves provided on both sides.

In these structures, each storage column has associated with it a reciprocable ejector, which is effective only in one direction and can be selected. After a selection has been made, each revolution of the annular disk causes forward and return movements of the ejector. That structure is expensive because it requires an ejecting assembly for each column and the control depends on relatively small tolerances regarding the clearance between the oppositely tapering wedge-shaped edges. Moreover, the running of an ejector pin on the wedge-shaped rims may result in certain rebound phenomena or shocks in the drive.

In the structure which has been described, the wedge-shaped edges forming an eccentric guide are provided on an endless belt, which in that embodiment too comprises an entry and exit opening providing a passage for a portion of an ejector and disposed between portions having different characteristics of motion. That belt is trained around cylindrical rollers at the ends of a row of storage columns for holding merchandise and a special selection is required in order to retract and extend an actuating element associated with an ejector into and out of the guiding wedge-shaped edges or the eccentric guide.

For this reason, such apparatus for delivering merchandize comprises rather complicated means for advancing and retracting the ejectors.

Within the scope of the invention, a reciprocable ejector is guided, e.g., in a slot of a column carrier. Such ejectors, which are effective only in one direction, may be triangular in side elevation and may be advanced in a vertical direction or provided with a pivoted member, which during the advance of the ejector, possibly with the aid of control means, presents a surface for engaging a merchandise package whereas the pivoted member does not exert an influence as it is retracted under the package of merchandise which has followed up in the column in the meantime.

Such ejectors may be used within the scope of the invention as well as ejectors of any other suitable kind; for instance, a channellike guide slot may be provided in the column carrier and may contain movable elements which can be moved in one direction to protrude from the slot and in the other direction to a position in which they are accommodated in the guide channel. The term "slot" covers also such guide channel.

If a plurality of ejectors are provided under respective storage columns for holding merchandise, control means for each ejector must be provided so that the control expenditure will be increased.

It is an object of the invention so to improve apparatus of the kind described first hereinbefore for delivering merchandise that the expenditure involved in the provision of a plurality of ejectors and associated control means will be avoided and a more uniform motion of the ejector can be effected by a relatively simple structure comprising simple drive means. The application to a large number of types of vending machine is contemplated.

This object is accomplished in accordance with the invention in that the above-mentioned element, which is adapted to be moved past all storage columns, serves to impart a search movement to only one ejector in an ejector guide relative to a selectable storage column as well as to reciprocate the ejector for an ejection. Within the scope of the invention, the ejector guide is adapted to be connected by coupling means associated with the storage columns to the element for the search movement and to the storage columns for the ejecting movement of the ejector. The various steps of the operation can be carried out by the same actuating means in conjunction with a simple switching of coupling means.

This teaching results in a substantial simplification of the expenditure because only one ejector is required for a large number of storage columns and is moved to the storage column by the same element which is used to reciprocate the ejector in order to eject a merchandise package. The storage column is adapted to be selected by a conventional selecting system. Within the scope of the invention, the selected storage column is marked by conventional photoelectric light barriers or the like.

Within the scope of the invention, an ejector guide provided with an ejector is adapted to be moved to a selected storage column. Thereafter, mutually complementary locking means are actuated to lock the ejector guide so that the ejector is adapted to be reciprocated in the locked ejector guide by the continued motion of the element.

The coupling means are suitably provided with excitable magnets for the coupling movement and, if desired, with springs for a return movement, the excitation being used to change the required connections.

The element consists preferably of an eccentric guide, to which the ejector is connected particularly by a pin-notch joint.

An advantage which is afforded regarding the searching movement as well as the ejecting movement of the ejector resides in that there is only one driving element because the ejector and its guide will be locked to the eccentric guide as a result of the search movement and when the ejector guide has been locked relative to the storage column the continued movement of the eccentric guide will result in the reciprocation of the ejector. For this reason, in accordance with the invention only one drive motor is required, which drives one element for the movement of the ejector to the selected storage column and for the reciprocation of the ejector. Because this one drive motor for both operations remains virtually continuously in operation, each operation can be performed within a short time. The operation of the locking and unlocking elements can be initiated, e.g., by photoelectric light barriers and in dependence on the velocity of the movement imparted to the eccentric guide by the one motor or said elements are so matched or are arranged with such lost motions in the direction of movement that the required locking and unlocking operations can be performed while the movement of the eccentric guide is continued. The locking and unlocking elements may be wedge-shaped so that an interengagement is ensured in spite of tolerances and the increasing cross-sections will ensure a definite positioning when a complete interengagement has been effected.

In a preferred embodiment the storage columns are arranged in a cylindrical array, a selected merchandise package can be ejected at the center of said array, the eccentric guide is formed by an ejector-controlling annular disk and the ejector guide is mounted to be reciprocable relative to the eccentric guide in the plane of the latter. That arrangement will have a relatively small height so that the space requirement will be reduced.

Where an ejector-controlling annular disk is used, an ejector carrier is desirably provided, which is carried by the annular disk and rotatable about the center of the array of storage columns and is formed with an exit opening, a frame of the ejector guide is mounted on the ejector carrier and reciprocable in the longitudinal direction of said guide, and retaining means are provided, which can be overcome and comprise a spring, which tends to hold the ejector guide in a position in which the ejector guide and the ejector can be moved past aligning means associated with each storage column and in an advanced position are arrested by engaging such aligning means. In that arrangement the ejector guide is used for locking and a cylindrical vending machine can be provided, in which the storage columns are arranged in a circular array and a central exit opening is available.

In order to permit a utilization of the movement of the frame of the ejector guide, the frame has suitably a pin, which is associated with a locking notch of the annular disk, a disengaging movement and rotation of the ejector guide relative to the annular disk holds the pin on a track that protrudes from the locking notch for one revolution of the annular disk and the ejector guide is releasably locked to the storage columns. The retaining device suitably comprises the spring as well as an electromagnet, which is carried by the ejector carrier and when energized pulls the ejector guide forward to unlock it and to hold it in position relative to the aligning means. It will be sufficient to excite the electromagnet for a short time if the track protrudes from a locking notch.

The annular disk which is concentric to the column carrier suitable comprises an inwardly facing track for guide rollers of the ejector carrier, which carries axial guides for the ejector guide. Another desirable feature in conjunction with the use of an ejector-controlling annular disk resides in that the ejector carrier substantially conforms to a central exit opening in the annular disk and has convexly curved side faces and retaining means which can be overcome are provided and comprise a spring and actuating means and are arranged on the ejector carrier on an edge thereof which faces away from the ejector guide. With that design, the exit opening of a cylindrical vending machine may be as large as possible.

In order to save space, e.g., to decrease the space requirement due to the outside contour of a cylindrical vending machine or to reduce the space required in front of a row of storage columns, a desirable further features resides in that the ejector is provided on the inside contour or the rear of the storage columns and is provided with an ejector element which consists of a spring element that is similar to a pulling hook and is reciprocable outwardly and inwardly by the eccentric guide under a lowermost merchandise package.

Figure 2:
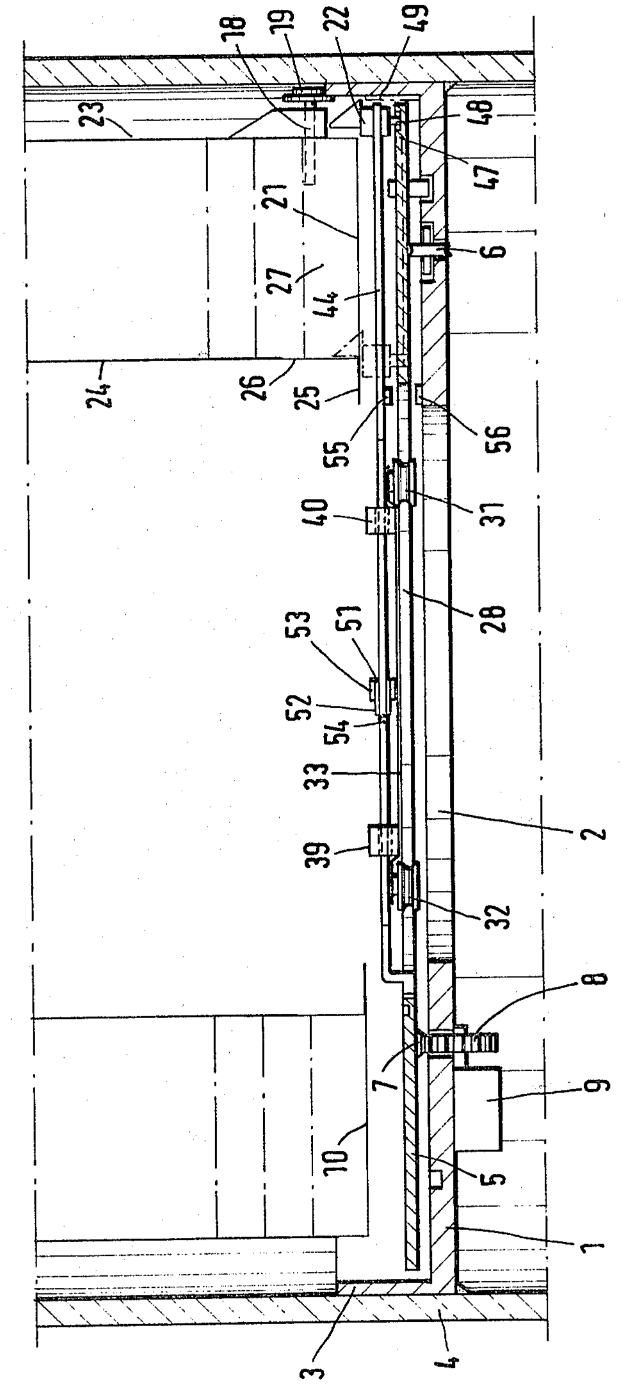
Figure 3:
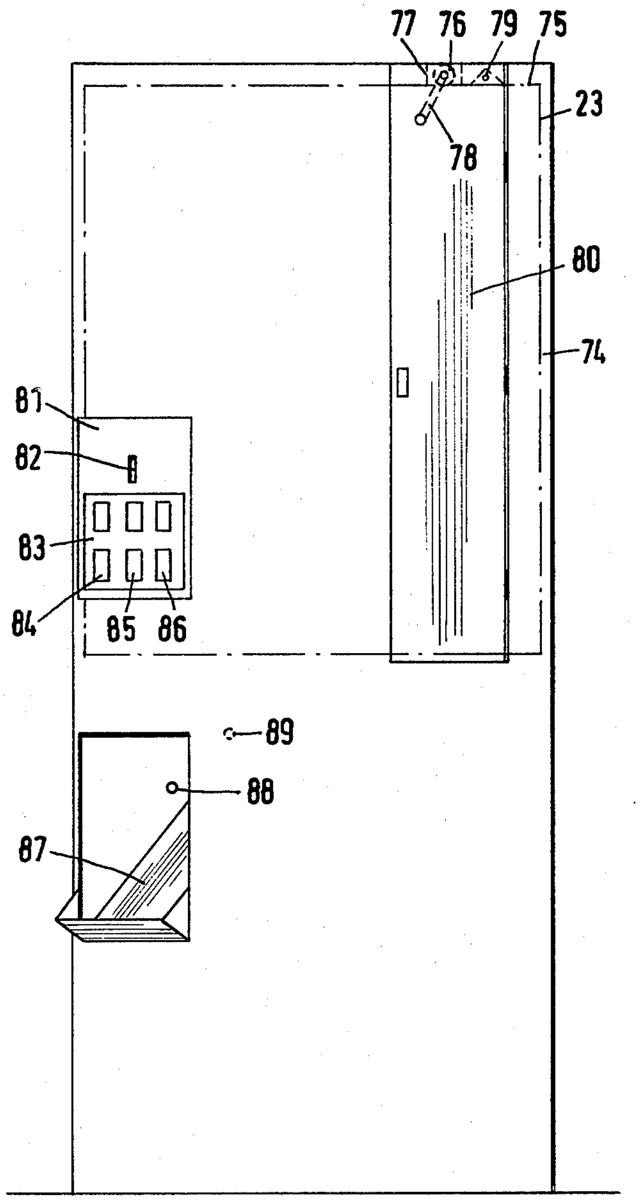
Figure 4:
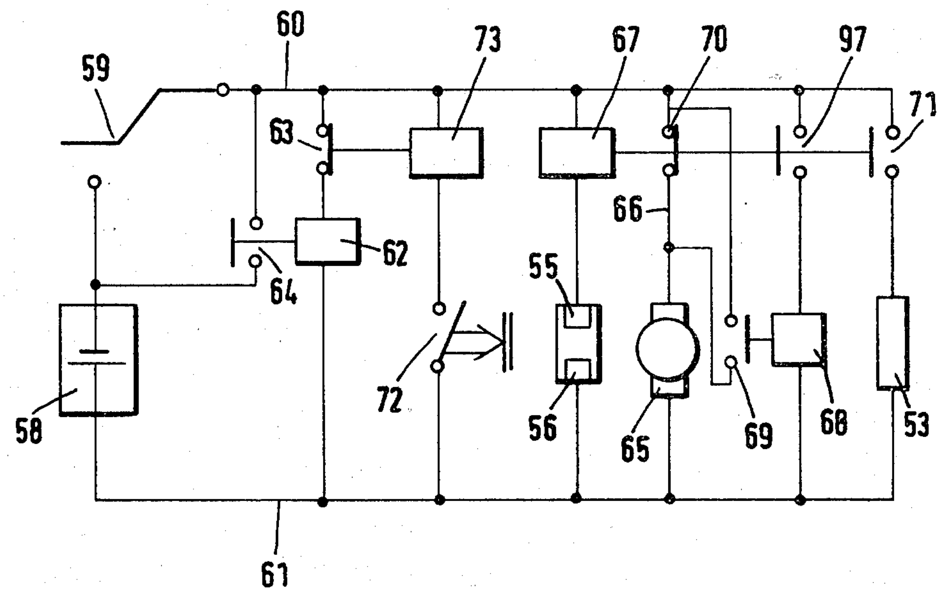
Figure 5:
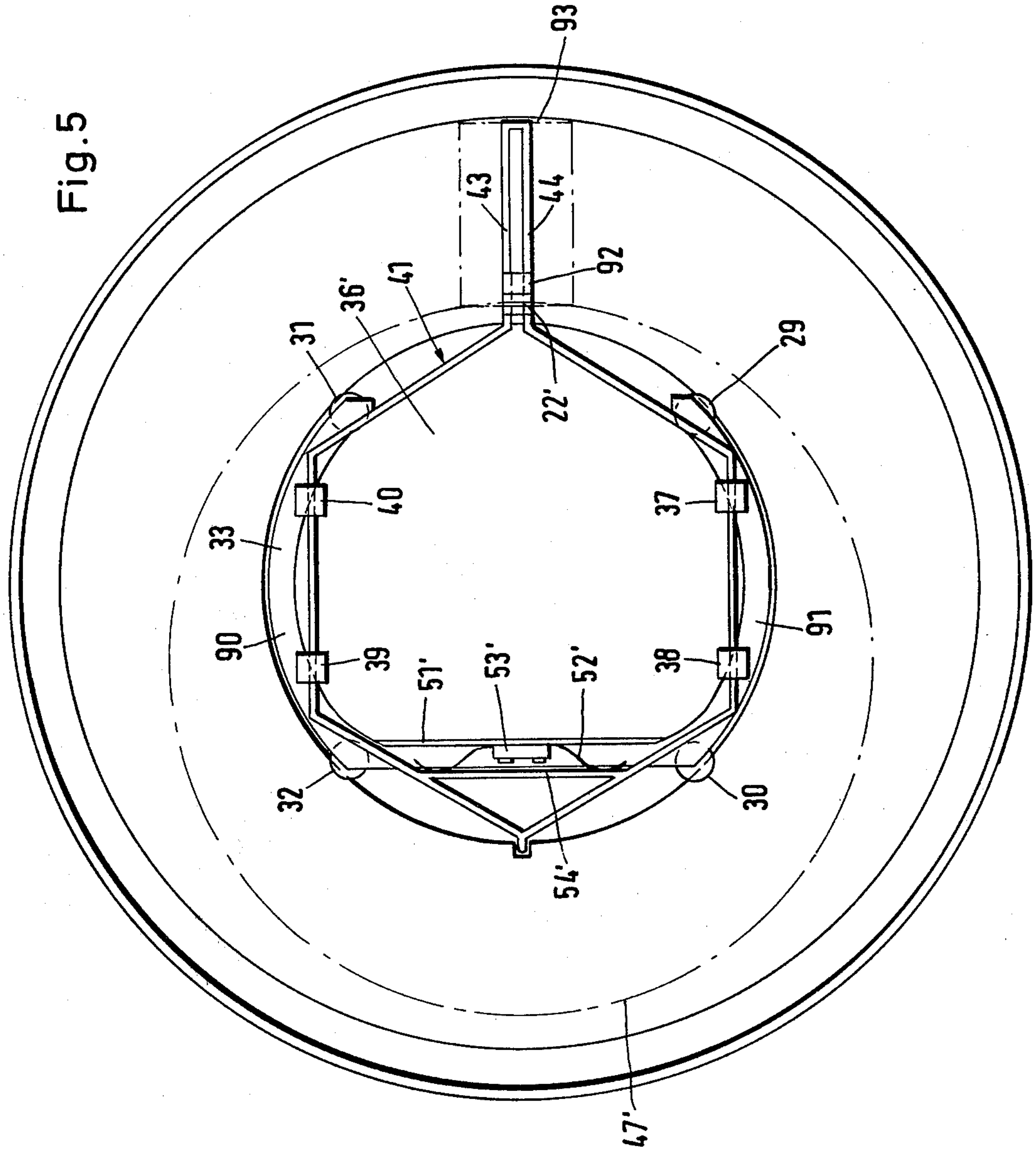
Figure 6:
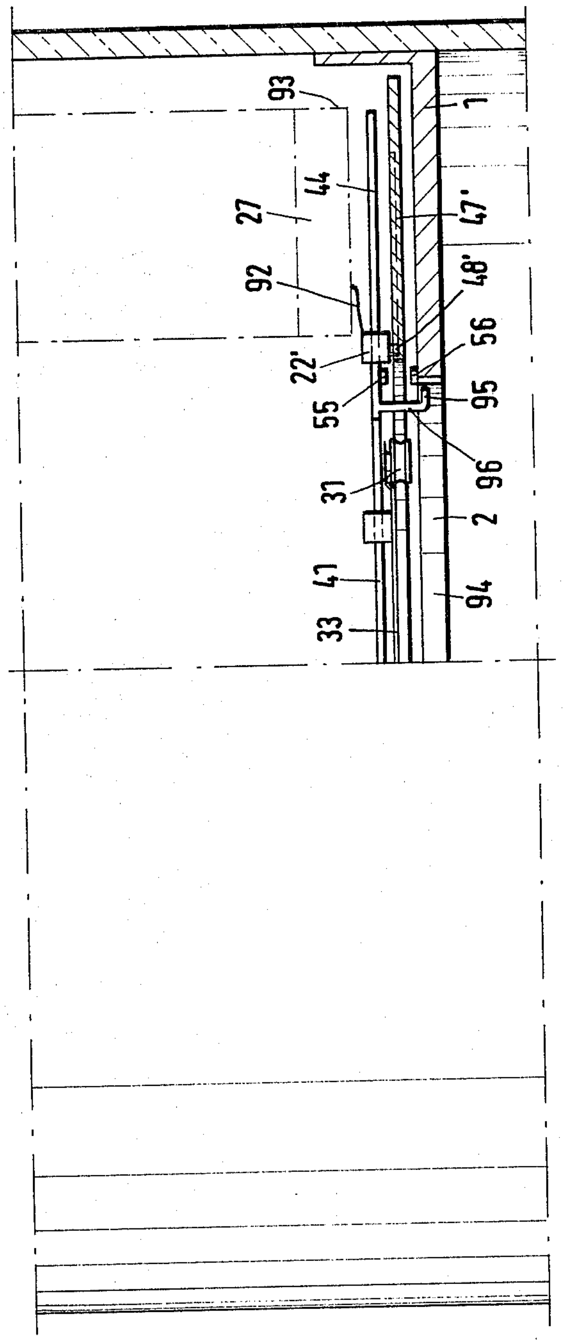

Illustrative embodiments of the invention will now be explained with reference to the accompanying drawings, in which FIG. 1 is a top plan view showing those operating parts of the ejecting assembly and adjacent parts of the apparatus for delivering merchandise, FIG. 2 is a sectional view taken on line II—II in FIG. 1, FIG. 3 is a side elevation showing a column-shaped body of a vending machine, FIG. 4 is an electric circuit diagram of the drive means and actuating means, FIG. 5 is a view similar to FIG. 1 and shows a different embodiment, and FIG. 6 is a view similar to FIG. 2 and shows a modification.

FIG. 1 shows the bottom 1 of a column-shaped body of a vending machine. The bottom defines a central opening 2 and consists of a circular ring provided at its outer rim with a raillike raised flange 3. The preferably transparent outer wall 4 of the column-shaped body of the vending machine is provided on the outside of that raillike flange 3.

An ejector-controlling annular disk 5 is rotatably guided in said raillike flange and is supported, e.g., by supporting rollers 6, which are peripherally spaced apart. The annular disk 5 has a downwardly facing ring gear 7, which is in mesh with a gear 8, which is fixed to a driving gearmotor 9. In this arrangement the annular disk can be rotated about the center of the bottom 1.

A column carrier 10 is disposed above the annular disk and carries a plurality of storage columns for holding merchandise. These columns form a circular array. The boundaries for storage columns 11-16 . . . are shown, for instance. As is apparent from the right-hand part of FIG. 2, radially outwardly directed axles 18 are carried by the column carrier 10, particularly by connecting pieces 17 between adjacent storage columns, and carry rollers 19, which can run on the top inner edge of the raillike flange. But that freedom of movement of the column carrier 10 is of secondary importance. Locking means 20 are provided, which lock the column carrier against a circumferential movement. In the embodiment shown by way of example it is contemplated to move the column carrier in order to move certain columns to a feed opening.

It will be understood that the annular disk 5 may be stationary and in that case drive means may be mounted on the column carrier.

A radial slot 21 extends centrally through the boundaries 11 to 16 of the storage columns at the bottom thereof. An ejector 22 is movable in said slot. It is emphasized that the column carrier is held together by outer and inner wall portions 23, 24 and, if desired, by an inwardly protruding annular bottom flange 25. An exit slot 26 for the delivery of a lowermost merchandise package 27 is provided over the flange 25.

The wall portions 23, 24 do not only constitute lateral guides for merchandise packages but engage the lowermost merchandise package from below so as to leave open at least part of the slot 21 of the ejector.

The inner rim 28 of the annular disk 5 is a guide rail for guiding guide rollers 29 to 32 carried by an ejector carrier 33. The latter is a plate, which is rotatable about the center line of the cylindrical overall assembly. That plate of the ejector carrier comprises two legs 34, 35 and is provided at one end between said legs with an exit opening 36 for the delivery of a merchandise package.

The ejector carrier 33 carries guide eyelets 37 to 40, in which an ejector guide 41 is guided in its axial direction. The ejector guide 41 comprises a frame 42, which is provided on the ejector carrier 33, and two closely spaced apart guide legs 43, 44, which constitute the ejector guide proper for guiding the ejector 22. The guide legs 43, 44 are disposed beside the exit opening 36. The other end of the frame 42 is provided with a centrally disposed pin 45, which is associated with a locking notch 46 in the inner rim of the annular disk 5.

The annular disk 5 is larger in outside diameter than the column carrier 10 and contains an open-topped cam track 47, which is eccentric to the center line of the apparatus and is constantly engaged by a guide pin 48 of the ejector; that pin is also referred to as an ejector pin. The difference between the diameters of the annular disk 5 and the column carrier 10 is so large that when the ejector 22 is in its outermost position at that portion of the cam track 47 which has the largest eccentricity, the ejector will be disposed outside the column carrier 10 and the storage columns. The spacing from the rail-like flange 3 will permit the outer end of the ejector guide and the ejector 22 held in that outer end to move past aligning means 49, 50 . . . , which suitably consist of mechanical stops in the form of abutment bars.

The ejector carrier 33 is provided with an upstanding flange 51 at the inner rim of the exit opening 36. A curved compression spring 52 and an electromagnet 53 are secured to the flange 51 and constitute actuating means. The compression spring acts on a crosspiece 54 of the frame 42 of the ejector guide to hold that crosspiece clear of the electromagnet 53. The crosspiece 54 also constitutes an anchor for the electromagnet when the latter is excited.

With reference to FIG. 1, such excitation will cause the frame 42 of the ejector guide to move to the right against the retaining means which can be overcome and comprise the spring 52. As a result, the pin 45 is lifted out of its locking notch 46 and at the same time the right-hand end of the legs 43, 44 of the ejector guide and the ejector 22 are moved outwardly into engagement with the aligning means 49. In the mechanical embodiment, the aligning means 49 consist of a stop although inductive couplings may also be used to ensure an alignment. The last-mentioned embodiments will afford the advantage that oscillations will be avoided.

It will be understood that the electromagnet 53 will not be excited until the driving gearmotor 9 has rotated the annular disk 5 and the cam track 47, which constitutes the eccentric guide, to a position in which the ejector guide 43, 44 registers with a selected storage column. Toward the end of that movement the electromagnet 53 is excited by the triggering device which will be described. The driving gearmotor 9 will continue to run regardless of the unlocking and locking movements. As a result, the arrival of the ejector guide 43, 44 at the selected storage column will be immediately succeeded by the ejecting movement as the annular disk 5 rotates under the column carrier 10 while the ejector carrier 33 is held in position. As a result, the ejector 22 is reciprocated to eject the lowermost merchandise package 27.

A triggering device consisting of a photoelectric light barrier comprising the elements 55, 56 is provided to excite the actuating device or electromagnet 53. A light transmitter 56 is provided on the bottom 1. A receiver 55 is responsive to light from the light transmitter to initiate the excitation of the electromagnet 53. It will be understood that the light barrier 55, 56 is sufficiently angularly spaced from the aligning means 49 so that the outward movement of the ejector guide and ejector to establish a connection to the aligning means is effected so soon that the aligning means cannot be skipped.

Owing to the operation of the driving gearmotor 9, the locking notch 46 moves away from the locked pin 45 so that the pin will engage the inner rim of the annular disk in response to a de-energization of the electromagnet 53. That inner rim serves as a track and ensures that the ejector guide will remain in its advanced position until the annular disk has rotated through 360°; the pin then falls back into its locking notch, provided that the eccentric guide rotates through 360° for one cycle, as is shown.

FIG. 4 is a circuit diagram of an embodiment of actuating means and the means for controlling them. A power source 58 is shown, which in the present circuit consists of a battery, which can be connected in circuit by a merchandise selector switch 59, which may be coupled to a switch that is responsive to the insertion of a coin so that voltage is then applied to the buses 60, 61 connected to the terminals of the battery. The pushbutton for selecting the merchandise is actuated only for a short time. Its actuation causes the relay 62 to be energized via its normally closed contacts 63 so that the holding contacts 64 then maintain the circuit closed. As a result, the motor 65 or 9 is started to revolve the frame 42 and the legs 43, 44 to the selected storage column. This is detected by the photoelectric light barrier consisting of the elements 55, 56 so that the relay 67 is energized to open at its contacts 70 the circuit 66 for energizing the motor 65. When the relay 67 is energized, the electromagnet 53 is energized via contacts 71 to move the frame 42 as described. At the same time, a relay 68 is energized via contacts 90 to close contacts 69, which bridge contacts 70, which are connected in the motor circuit 66 and are opened as the relay 67 is energized. The relay contacts are actuated at different times so that the motor 65 or 9 remains energized during the described switching sequence. The frame 42 has already been removed from the locking notch 46. For this reason the motor 65 will be running to move the frame 42 even when the photoelectric light barrier consisting of the elements 55, 56 has been cleared and the relay 67 has been de-energized. In response to the clearing of the photoelectric light barrier, the motor 65 is directly connected in the circuit 66 by the normally closed contacts 70 and the circuit of the relay 68 is opened. In response to its energization, the relay 67 had energized via its normally open contacts 71 the electromagnet 53 so that the latter had unlocked the frame 42 at 45, 46. This unlocked state is maintained by the continued operation of the motor 65. The several relays may operate with such time delays that the ejector carrier 33 is started first and revolves until the frame and the guide legs 43, 44 have reached the selected storage column. The motor 65 for imparting the revolution is then de-energized for a short time and the electromagnet 53 is excited to move the frame 42. This results in a re-energization of the motor 65 in the described manner so that the ejector carrier 33 is driven to move the ejector 22 along the cam track 47.

The movement of the frame 42 controls a switch 72, which is initially open and remains open during the axial movement of the frame 42 but is closed for a short time by the frame 42 when the same has rotated through 360° and returns to its initial position, in which the pin 45 lies in the locking notch 46. In response to the closing of the switch 72, the relay 73 is energized so that its normally closed contacts 63 are opened for a short time to de-energize the relay 62. As a result, the holding contacts 64 are opened to de-energize the circuit in the initial position. A new selection can now be made.

FIG. 3 shows an entire column-shaped body 74 of a vending machine. A ring gear 75 is provided on the top of the outer wall portions 23 of the column carrier and in mesh with a gear 76 of a drive mechanism 77 which can be manually operated by a slipped-on crank handle 78. A locking pin 79 is provided to lock the mechanism in a selected position.

When the mechanism has been unlocked, the slipped-on handle 78 can be actuated or a suitable motor can be energized to rotate the column carrier 10 on its rollers 19 so as to align the storage columns in succession with a feed opening 80 through which the storage columns can be filled. The feed opening is accessible through a door.

FIG. 3 shows also a selecting system 81, which includes a coin slot 82. A coin inserted through the slot 82 may pass through an optional coin-testing device and will then actuate a coin-detecting switch to initiate the operation. The selecting system 81 comprises a control panel 83, which is provided with switches 84 to 86 . . . for selecting respective storage columns by energizing the light transmitter 56 associated with the selected storage column.

It is also seen in FIG. 3 that a discharge chute 87 for merchandise delivered by the described apparatus is disposed below the column-shaped body 74 of the vending machine. The discharge chute may be supervised by an additional photoelectric light barrier, which consists of the elements 88, 89. That photoelectric light barrier 88, 89 delivers to the circuit an additional signal to initiate a return to the initial position.

FIGS. 5 and 6 show two modifications. One modification resides in that there are several tiers of storage columns and ejector-controlling annular disks etc. associated with respective tiers. Each tier is provided with a separate column carrier 10 (FIG. 1). Because each merchandise package is ejected through the central exit opening 36, the exit opening 36' in FIG. 5 will extend as far as possible throughout the area of the central opening 2 if the tiers are operated independently of each other. For this purpose the ejector carrier 33' is provided between its guide rollers 29 to 32 with conforming curved side portions 90, 91, on which the guide eyelets 37 to 40 for the ejector guide 41 are disposed as far outwardly as possible. In this embodiment the rim flange 51 is replaced by a raised rim flange 51' so that the crosspiece 54' is as remote as possible from the exit opening and the compression spring 52' and the electromagnet 53' are arranged at the edge of the exit opening 36'. As a result, the entire central area is available for the exit opening so that there will be an open passage from the ejector carrier 33 or 33' in various angular positions. Each tier is provided with guide faces or chutes for the guidance of merchandise packages to be ejected.

As is apparent from a compression of FIGS. 5 and 1, the ejector 22 is replaced by an ejector 22' disposed on the inside of the cylindrical array of storage columns and comprising a hook-shaped tongue 92, which engages the lowermost merchandise package from below and during the outward movement of the ejector 22' embraces the outer edge 93 of the lowermost merchandize package and then pulls back that package. In that embodiment, the direction of eccentricity of the eccentric guide 47' is opposite to that shown in FIG. 1 so that its rotation will result in outward-inward movements rather than in inward-outward movement. For this reason the ejector guide having the guide legs 43, 44 may be shorter so that the overall circumference of the apparatus is reduced. Nevertheless, the pin 48' is properly guided in the eccentric guide 47'.

The aligning means previously designated 49 may also be disposed on the inside. For this purpose an inwardly directed pin 95 is associated with each storage column and provided at the inner rim 94 of the central opening 2 and the ejector guide 41 is provided with a depending pin 96, which moves past the pins 95 for the respective storage columns when the ejector guide 41 is in its initial position but will lock the ejector guide in alignment with a storage column in response to the operation of the photoelectric light barrier 55, 56 when the ejector guide is to be actuated.

What is claimed is:

1. Apparatus for delivering merchandise from vending machines, comprising juxtaposed storage columns for merchandise, each of said columns including wall portions for guiding merchandise packages, said wall portions defining at the bottom of said column at least one ejector-receiving slot and one exit slot longitudinally aligned with said ejector-receiving slot, an ejector guide, an ejector, which is reciprocable in said ejector guide and adapted to enter the ejector-receiving slot, an element which interengages with the ejector and is movable past all storage columns, drive means for driving said element, first coupling means operable to selectively couple said ejector guide to said element, and second coupling means operable to selectively couple said ejector guide to parts of the apparatus which are rigid with respective ones of said storage columns, said ejector guide being movable into alignment with each of said storage columns in unison with said element when said first coupling means have been operated, said second coupling means being arranged to be operated in response to the alignment of said ejector guide with a selected one of said storage columns and to impart by said operation to said ejector guide a longitudinal movement toward said selected storage column, said first coupling means being arranged to be released in response to said alignment of said ejector guide with said selected storage column, said ejector being arranged to be reciprocated in said ejector guide and under said selected storage column in said ejector-receiving slot in response to a continued movement of said element when said ejector guide has been aligned with said storage column and said second coupling means have been operated, an exit opening being provided at one end of the ejector guide.

2. Apparatus as set forth in claim 1, wherein said second coupling means comprise excitable electromagnets and springs, and said first coupling means are arranged to be released in response to the operation of said second coupling means.

3. Apparatus as set forth in claim 1, wherein said element consists of an eccentric guide and said ejector comprises interengaging means, which interengage with said eccentric guide.

4. Apparatus as set forth in claim 3, wherein said storage columns are arranged in a cylindrical array, said exit opening is centrally disposed, said eccentric guide comprises an ejector-controlling annular disk, a drive motor is operatively connected to said annular disk, and said ejector guide is mounted to be reciprocable in the plane of said eccentric guide.

5. Apparatus as set forth in claim 4, wherein bearing means are mounted on said annular disk, an ejector carrier is provided, which is concentric to said storage columns and rotatably mounted on said bearing means, said ejector guide comprises a frame, additional bearing means are provided on said ejector carrier, said frame is guided in said additional bearing means and reciprocable therein in the longitudinal direction of said ejector guide, retaining means which are adapted to be overcome are provided and comprise spring means for yieldably holding said first coupling means in their coupling position, in which said first coupling means cause said ejector guide and ejector carrier to move in unison with said annular disk, a plurality of aligning means are provided, which are associated with respective storage columns and arranged to effect a release of said first coupling means and the operation of said second coupling means in response to the alignment of said ejector guide with a selected storage column and the engagement of said ejector guide with the aligning means associated with said selected storage column.

6. Apparatus according to claim 5, wherein said first coupling means comprise a pin, which is rigid with said frame, and a locking notch formed in said annular disk, said annular disk is adapted to perform a disengaging movement and an angular movement relative to said annular disk, said pin being arranged to be held during said angular movement in engagement with a track which protrudes from said locking notch during one revolution of said annular disk, and said ejector guide is arranged to be releasably held in position relative to said storage columns during said revolution of said annular disk.

7. Apparatus as set forth in claim 5, wherein said ejector carrier carries retaining means comprising spring means and an electromagnet and said electromagnet is excitable to impart to said ejector guide a movement whereby said first coupling means comprising said pin and said locking notch are released and said ejector guide is locked to one of said aligning means.

8. Apparatus as set forth in claim 5, wherein said bearing means comprise an inwardly directed roller track and further comprise guide rollers which are carried by said ejector carrier and adapted to roll on said roller track, a storage column carrier is provided, which is concentric to said roller track, and said additional bearing means are carried by said ejector carrier and constitute axial tracks for said ejector guide.

9. Apparatus as set forth in claim 5, wherein said ejector carrier has such a contour that at least part of a central exit opening formed in said annular disk will remain open throughout the revolution of said ejector carrier, said ejector carrier has outwardly convexly curved side portions, retaining means adapted to be overcome are provided and mounted on said ejector carrier on an edge portion thereof which is remote from said ejector guide, said retaining means comprising a spring and actuating means.

10. Apparatus according to claim 5, wherein said ejector interengaging with said eccentric guide is adapted to assume in said ejector guide an initial position on the inside of said storage columns and said ejector is provided with an ejecting element, which consists of a spring element similar to a pulling hook and which when said first coupling means have been released and said second coupling means have been operated is arranged to move outwardly and inwardly under a lowermost merchandise package in response to a movement of said eccentric guide.

* * * * *